United States Patent
Mauri et al.

(10) Patent No.: US 9,922,672 B1
(45) Date of Patent: Mar. 20, 2018

(54) DUAL FREE LAYER MAGNETIC READER HAVING A REAR BIAS STRUCTURE HAVING A HIGH ASPECT RATIO

(71) Applicant: Western Digital (Fremont), LLC, Fremont, CA (US)

(72) Inventors: Daniele Mauri, San Jose, CA (US); Savas Gider, San Jose, CA (US); Hui Zhao, Fremont, CA (US); Ming Mao, Dublin, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/236,386

(22) Filed: Aug. 12, 2016

Related U.S. Application Data

(60) Division of application No. 14/674,899, filed on Mar. 31, 2015, now Pat. No. 9,449,621, which is a continuation-in-part of application No. 14/670,340, filed on Mar. 26, 2015, now Pat. No. 9,384,763.

(51) Int. Cl.
G11B 5/39 (2006.01)

(52) U.S. Cl.
CPC .......... *G11B 5/3906* (2013.01); *G11B 5/3932* (2013.01)

(58) Field of Classification Search
None
See application file for complete search history.

(56) References Cited

U.S. PATENT DOCUMENTS

| | | |
|---|---|---|
| 5,434,826 A | 7/1995 | Ravipati et al. |
| 5,576,914 A | 11/1996 | Rottmayer et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |

(Continued)

OTHER PUBLICATIONS

Notice of Allowance dated Mar. 15, 2016, from U.S. Appl. No. 14/670,340, 5 pp.

(Continued)

*Primary Examiner* — Will J Klimowicz

(74) *Attorney, Agent, or Firm* — Foley & Lardner LLP

(57) ABSTRACT

A magnetic read apparatus has an air-bearing surface (ABS) and includes a read sensor and a rear magnetic bias structure. The read sensor includes first and second free layers, a spacer layer and a rear surface opposite to the ABS. The spacer layer is nonmagnetic and between the first and second free layers. The read sensor has a track width in a cross track direction parallel to the ABS. The rear magnetic bias structure magnetically biases the read sensor a stripe height direction perpendicular to the ABS. The read sensor is between the ABS and the rear magnetic bias structure. The rear magnetic bias structure has a width in the cross track direction and a length in the stripe height direction. The length is greater than the width. The width of the rear magnetic bias structure is substantially equal to the track width of the read sensor.

18 Claims, 8 Drawing Sheets

(56) References Cited

U.S. PATENT DOCUMENTS

| | | |
|---|---|---|
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai |
| 6,118,638 A | 9/2000 | Knapp et al. |
| 6,125,018 A | 9/2000 | Takagishi |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,466,418 B1 | 10/2002 | Horng et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |

(56) References Cited

U.S. PATENT DOCUMENTS

| | | |
|---|---|---|
| 6,654,195 B1 | 11/2003 | Frank, Jr. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,914,759 B2 | 7/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,944,939 B2 | 9/2005 | Guo et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,016,166 B1 | 3/2006 | Hou et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,079,361 B2 | 7/2006 | Sugita et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,126,795 B2 | 10/2006 | Funayama et al. |
| 7,126,797 B2 | 10/2006 | Hasegawa et al. |
| 7,130,165 B2 | 10/2006 | Macken et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,155,810 B2 | 1/2007 | Pinarbasi |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,229,706 B2 | 6/2007 | Hasegawa et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,268,985 B2 | 9/2007 | Freitag et al. |
| 7,275,304 B2 | 10/2007 | Sakai et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,301,734 B2 | 11/2007 | Guo et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |

(56) References Cited

U.S. PATENT DOCUMENTS

| | | |
|---|---|---|
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,446,987 B2 | 11/2008 | Zhang et al. |
| 7,468,870 B2 | 12/2008 | Arasawa et al. |
| 7,493,688 B1 | 2/2009 | Wang et al. |
| 7,508,627 B1 | 3/2009 | Zhang et al. |
| 7,515,388 B2 | 4/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,599,158 B2 | 10/2009 | Wang et al. |
| 7,615,996 B1 | 11/2009 | Machita et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,675,718 B2 | 3/2010 | Chang et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,804,668 B2 | 9/2010 | Zhou et al. |
| 7,819,979 B1 | 10/2010 | Chen et al. |
| 7,826,179 B2 | 11/2010 | Shimazawa et al. |
| 7,829,264 B1 | 11/2010 | Wang et al. |
| 7,839,606 B2 | 11/2010 | Jayasekara |
| 7,843,668 B2 | 11/2010 | Machita et al. |
| 7,846,643 B1 | 12/2010 | Sun et al. |
| 7,848,065 B2 | 12/2010 | Freitag et al. |
| 7,855,854 B2 | 12/2010 | Hu et al. |
| 7,855,859 B2 | 12/2010 | Hara et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,881,023 B1 | 2/2011 | Machita et al. |
| 7,894,166 B2 | 2/2011 | Yamazaki et al. |
| 7,894,167 B2 | 2/2011 | Kanaya et al. |
| 7,898,776 B2 | 3/2011 | Nakabayashi et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,961,438 B2 | 6/2011 | Mizuno et al. |
| 7,968,219 B1 | 6/2011 | Jiang et al. |
| 7,974,048 B2 | 7/2011 | Shimazawa et al. |
| 7,982,989 B1 | 7/2011 | Shi et al. |
| 8,008,912 B1 | 8/2011 | Shang |
| 8,011,084 B2 | 9/2011 | Le et al. |
| 8,012,804 B1 | 9/2011 | Wang et al. |
| 8,014,108 B2 | 9/2011 | Shimazawa et al. |
| 8,015,692 B1 | 9/2011 | Zhang et al. |
| 8,015,694 B2 | 9/2011 | Carey et al. |
| 8,018,677 B1 | 9/2011 | Chung et al. |
| 8,018,678 B1 | 9/2011 | Zhang et al. |
| 8,018,691 B2 | 9/2011 | Gill et al. |
| 8,023,230 B2 | 9/2011 | Machita et al. |
| 8,024,748 B1 | 9/2011 | Moravec et al. |
| 8,031,445 B2 | 10/2011 | Zhou et al. |
| 8,049,997 B2 | 11/2011 | Miyauchi et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,089,734 B2 * | 1/2012 | Miyauchi ............... B82Y 10/00 360/319 |
| 8,091,210 B1 | 1/2012 | Sasaki et al. |
| 8,094,420 B2 | 1/2012 | Ayukawa et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,130,475 B2 | 3/2012 | Kawamori et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,144,437 B2 | 3/2012 | Miyauchi et al. |
| 8,146,236 B1 | 4/2012 | Luo et al. |
| 8,147,994 B2 | 4/2012 | Matsuzawa et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,179,642 B2 | 5/2012 | Kawamori et al. |
| 8,191,237 B1 | 6/2012 | Luo et al. |
| 8,194,363 B2 | 6/2012 | Hara et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,225,489 B2 | 7/2012 | Miyauchi et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,247 B2 | 7/2012 | Carey et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |

(56) References Cited

U.S. PATENT DOCUMENTS

| | | |
|---|---|---|
| 8,270,126 B1 | 9/2012 | Roy et al. |
| 8,274,764 B2 | 9/2012 | Hara et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,369,048 B2 | 2/2013 | Miyauchi et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang et al. |
| 8,472,288 B1 | 6/2013 | Wolf et al. |
| 8,477,461 B2 | 7/2013 | Chou et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,553,369 B2 | 10/2013 | Song et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,576,518 B1 * | 11/2013 | Zeltser ............ G11B 5/3912 360/319 |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,247 B2 | 11/2013 | Song et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,609,262 B2 | 12/2013 | Horng et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,659,855 B2 * | 2/2014 | Dimitrov ............ B82Y 10/00 360/315 |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,217 B1 | 3/2014 | Braganca et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,705,212 B2 | 4/2014 | Gadbois et al. |
| 8,711,518 B1 | 4/2014 | Zeng et al. |

(56) References Cited

U.S. PATENT DOCUMENTS

| | | | |
|---|---|---|---|
| 8,711,528 B1 | 4/2014 | Xiao et al. | |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,749,926 B1 | 6/2014 | Le et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao et al. | |
| 8,780,508 B2* | 7/2014 | Dimitrov | G11B 5/3912 360/324 |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 8,842,396 B1 | 9/2014 | Zhu | |
| 8,891,208 B2 | 11/2014 | Degawa et al. | |
| 8,913,349 B2 | 12/2014 | Yamane et al. | |
| 9,007,725 B1 | 4/2015 | Diao | |
| 9,053,720 B1* | 6/2015 | Chye | G11B 5/3912 |
| 9,076,468 B1 | 7/2015 | Keener | |
| 9,099,122 B2* | 8/2015 | Jiang | G11B 5/3903 |
| 9,147,404 B1 | 9/2015 | Luo | |
| 9,153,258 B2* | 10/2015 | Le | G11B 5/3906 |
| 9,208,804 B1* | 12/2015 | Isowaki | G11B 5/3912 |
| 9,214,171 B2* | 12/2015 | Isowaki | G11B 5/3912 |
| 9,384,763 B1* | 7/2016 | Liu | G11B 5/3932 |
| 9,449,621 B1* | 9/2016 | Mauri | G11B 5/3951 |
| 9,472,216 B1* | 10/2016 | Mauri | G11B 5/3912 |
| 2002/0024777 A1 | 2/2002 | Funayama et al. | |
| 2002/0039264 A1 | 4/2002 | Ohsawa et al. | |
| 2005/0275975 A1 | 12/2005 | Zhang et al. | |
| 2006/0109592 A1 | 5/2006 | Watanabe et al. | |
| 2007/0217077 A1 | 9/2007 | Kanaya et al. | |
| 2007/0285849 A1 | 12/2007 | Jayasekara | |
| 2009/0073616 A1 | 3/2009 | Shimazawa et al. | |
| 2009/0135529 A1 | 5/2009 | Shimazawa et al. | |
| 2009/0168264 A1 | 7/2009 | Hara et al. | |
| 2009/0180217 A1 | 7/2009 | Chou et al. | |
| 2009/0190272 A1 | 7/2009 | Machita et al. | |
| 2009/0201612 A1 | 8/2009 | Shimazawa et al. | |
| 2009/0207534 A1 | 8/2009 | Miyauchi et al. | |
| 2009/0213502 A1 | 8/2009 | Miyauchi et al. | |
| 2009/0273864 A1 | 11/2009 | Machita et al. | |
| 2009/0290264 A1 | 11/2009 | Ayukawa et al. | |
| 2009/0303779 A1 | 12/2009 | Chen et al. | |
| 2010/0027168 A1 | 2/2010 | Chou et al. | |
| 2010/0053820 A1 | 3/2010 | Miyauchi et al. | |
| 2010/0079917 A1 | 4/2010 | Miyauchi et al. | |
| 2010/0103562 A1 | 4/2010 | Machita et al. | |
| 2010/0103563 A1 | 4/2010 | Machita et al. | |
| 2010/0149689 A1 | 6/2010 | Tsuchiya et al. | |
| 2010/0214696 A1 | 8/2010 | Matsuzawa et al. | |
| 2010/0214700 A1 | 8/2010 | Hara et al. | |
| 2010/0232066 A1 | 9/2010 | Hara et al. | |
| 2010/0232073 A1 | 9/2010 | Chou et al. | |
| 2010/0290157 A1 | 11/2010 | Zhang et al. | |
| 2011/0026169 A1 | 2/2011 | Gill et al. | |
| 2011/0051291 A1 | 3/2011 | Miyauchi et al. | |
| 2011/0069417 A1 | 3/2011 | Kawamori et al. | |
| 2011/0086240 A1 | 4/2011 | Xiang et al. | |
| 2011/0091744 A1 | 4/2011 | Kawamori et al. | |
| 2011/0215800 A1 | 9/2011 | Zhou et al. | |
| 2011/0232079 A1 | 9/2011 | Miyauchi et al. | |
| 2011/0235216 A1 | 9/2011 | Lin | |
| 2011/0273802 A1 | 11/2011 | Zhou et al. | |
| 2011/0317313 A1 | 12/2011 | Miyauchi et al. | |
| 2012/0129007 A1 | 5/2012 | Zheng et al. | |
| 2012/0111826 A1 | 8/2012 | Chen et al. | |
| 2012/0216378 A1 | 8/2012 | Emley et al. | |
| 2012/0237878 A1 | 9/2012 | Zeng et al. | |
| 2012/0275062 A1 | 11/2012 | Gao | |
| 2012/0281319 A1 | 11/2012 | Singleton et al. | |
| 2012/0281320 A1 | 11/2012 | Singleton et al. | |
| 2012/0298621 A1 | 11/2012 | Gao | |
| 2013/0069642 A1 | 3/2013 | Sapozhnikov et al. | |
| 2013/0149559 A1 | 6/2013 | Covington et al. | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0002930 A1* | 1/2014 | Dimitrov | G11B 5/398 360/235.4 |
| 2014/0004385 A1* | 1/2014 | Colak | G11B 5/3912 428/815 |
| 2014/0004386 A1* | 1/2014 | Covington | G11B 5/3932 428/816 |
| 2014/0035075 A1 | 2/2014 | Zhu et al. | |
| 2014/0049857 A1* | 2/2014 | Isowaki | G11B 5/3163 360/244 |
| 2014/0153138 A1* | 6/2014 | Le | G11B 5/3909 360/294 |
| 2014/0154529 A1 | 6/2014 | Yang et al. | |
| 2014/0175050 A1 | 6/2014 | Zhang et al. | |
| 2014/0268405 A1 | 9/2014 | Machita et al. | |
| 2015/0002961 A1 | 1/2015 | Keener | |
| 2015/0147481 A1* | 5/2015 | Braganca | C25D 5/48 427/529 |
| 2015/0154990 A1 | 6/2015 | Jiang et al. | |
| 2015/0154991 A1* | 6/2015 | Le | G11B 5/3906 360/97.11 |
| 2015/0221325 A1* | 8/2015 | Ho | G11B 5/3912 360/125.03 |
| 2015/0332712 A1* | 11/2015 | Isowaki | G11B 5/3912 360/319 |

OTHER PUBLICATIONS

Ex parte Quayle Action dated Dec. 30, 2015, from U.S. Appl. No. 14/670,340, 9 pp.

Zhitao Diao, et al., U.S. Appl. No. 14/508,697, filed Oct. 7, 2014, 29 pages.

Anup G. Roy, et al., U.S. Appl. No. 14/310,122, filed Jun. 20, 2014, 34 pages.

Office Action dated Sep. 30, 2014 from U.S. Appl. No. 14/310,122, 18 pages.

"Scissors-type trilayer giant magnetoresistive sensor using heusler alloy ferromagnet," http://phys.org/news/ 2011-11-scissors-type-trilayer-giant-magnetoresistive-sensor.html, downloaded on Jul. 29, 2014, pp. 1-9.

Han, et al., "Perspectives of Read Head Technology for 10 Tb/in2 Recording", IEEE Transactions on Magnetics, vol. 46, No. 3, Mar. 2010, pp. 709-714.

Jiang-Gang (Jimmy) Zhu, "New heights for hard disk drives," MaterialsToday, Jul./Aug. 2003, pp. 22-30.

Wang, et al., "Downtrack response of differential reader for high density magnetic recording," Data Storage Institute, Agency for Science, Technology and Research (A*STAR), pp. 1-13.

Robert Lamberton, et al., "Current-in-Plane GMR Trilayer Head Design for Hard-Disk Drives: Characterization and Extendibility," IEEE Transactions on Magnetics, vol. 43, No. 2, Feb. 2007, pp. 645-650.

Feng Liu, et al., U.S. Appl. No. 14/670,340, filed Mar. 26, 2015, 31 pages.

Anup G. Roy, et al., U.S. Appl. No. 14/621,712, filed Feb. 13, 2015, 30 pages.

(56) References Cited

OTHER PUBLICATIONS

"Scissors-type Trilayer Giant Magnetoresistive Sensor using Heusler Alloy Ferromagnet for Narrow Reader of Ultra-high Density Hard Disk Drives," http://www.nims.go.jp/eng/news/press/2011/10/p201110310.html, downloaded on Jul. 29, 2014, pp. 1-3.

* cited by examiner

ABS View

DUAL FREE LAYER MAGNETIC READER HAVING A REAR BIAS STRUCTURE HAVING A HIGH ASPECT RATIO

CROSS-REFERENCE TO RELATED APPLICATIONS

The present application is a divisional of co-pending U.S. patent application Ser. No. 14/674,899 filed on Mar. 31, 2015, which is a continuation-in-part of U.S. patent application Ser. No. 14/670,340, filed on Mar. 26, 2015, and incorporated herein by reference.

BACKGROUND

FIG. 1 depicts an air-bearing surface (ABS) view of a conventional read transducer used in magnetic recording technology applications. The conventional read transducer 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current-in-plane (CIP) configuration, then conductive leads (not shown) would be provided on the magnetic bias structures 16. The magnetic bias structures 16 are used to magnetically bias the free layer 28.

Although the conventional transducer 10 functions, there are drawbacks. The trend in magnetic recording is to higher density memories. The conventional read sensor 20 may not adequately read high density media. As a result, dual free layer magnetic read sensors have been developed. In such read sensors, two free layers that are biased in a scissor state by a hard magnet. The read sensor may not, however, be reliable in such a conventional magnetic reader. Such reliability issues may become particularly acute at high densities and lower track widths on the order of less than or equal to thirty nanometers. For example, in such high density dual free layer readers, the state in which the free layers are biased may be unpredictable. Accordingly, what is needed is a system and method for improving the performance of a magnetic recording read transducer.

BRIEF DESCRIPTION OF SEVERAL VIEWS OF THE DRAWINGS

FIGS. 3A-3B depict plan and side views of another exemplary embodiment of a portion of a dual free layer magnetic read transducer.

DETAILED DESCRIPTION OF THE PREFERRED EMBODIMENTS

Figure 1:
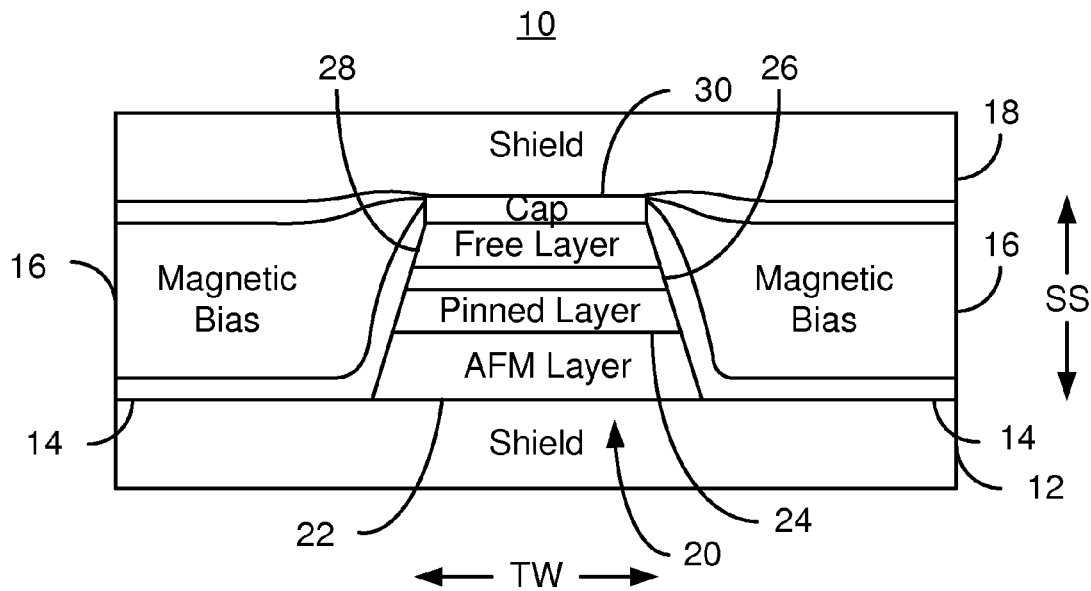
FIG. 1 depicts an ABS view of a conventional magnetic recording read transducer.
Figure 2A:
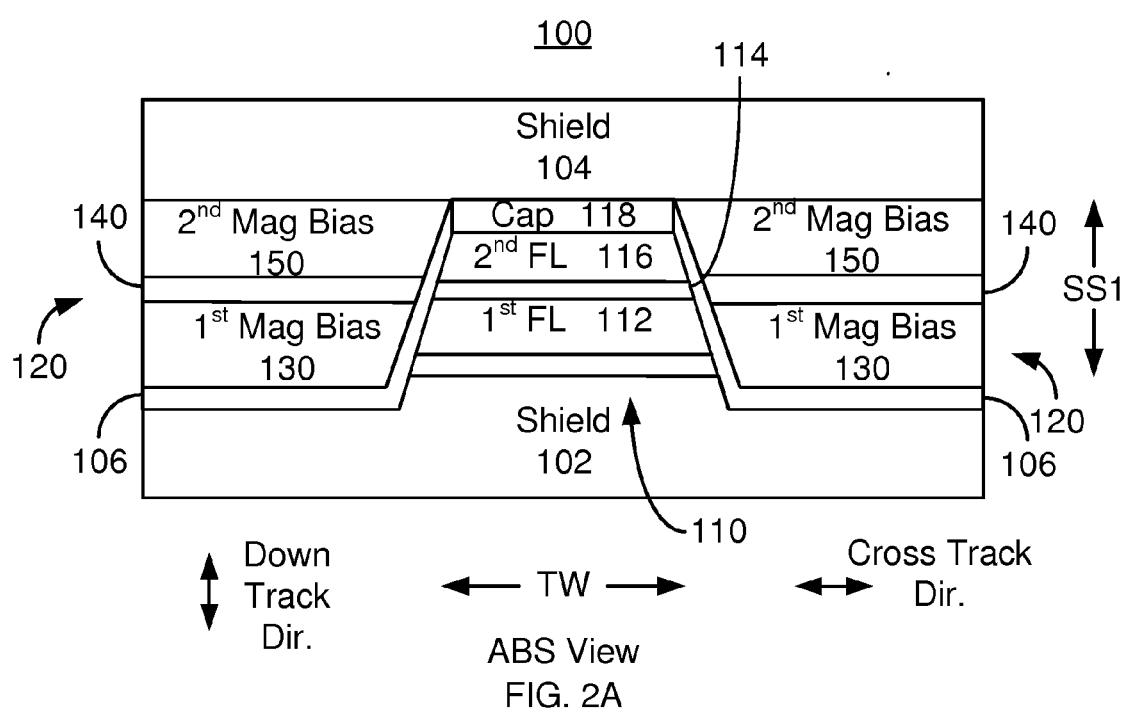
FIGS. 2A-2C depicts ABS, plan and side views of an exemplary embodiment of a portion of a dual free layer magnetic read transducer.
Figure 2B:
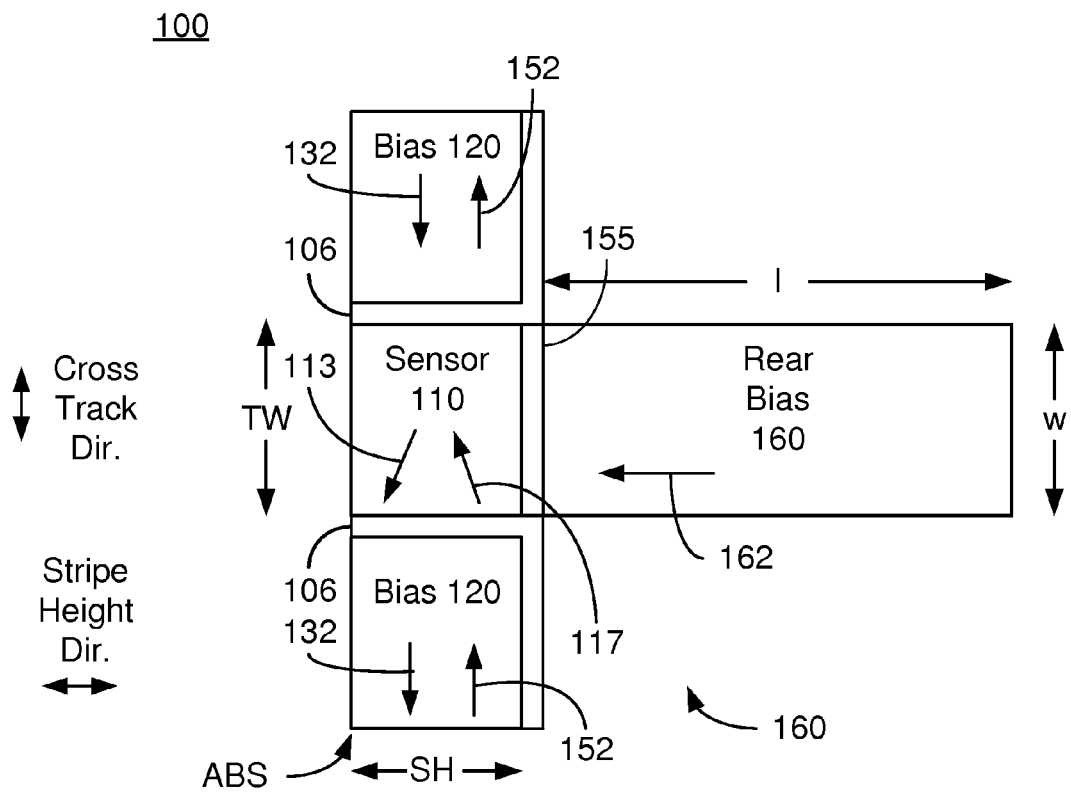
Figure 2C:
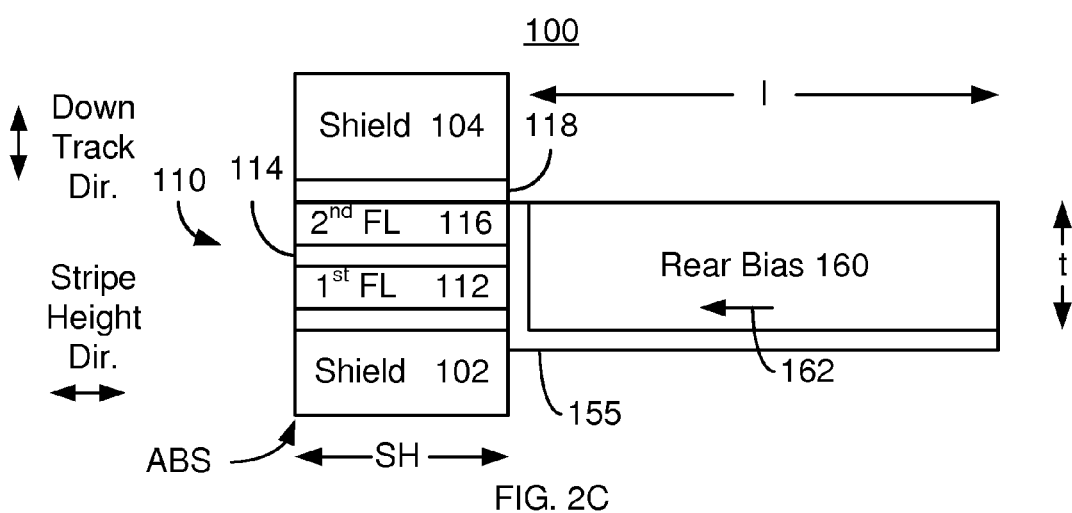

FIGS. 2A-2C depict ABS, plan and side views of an exemplary embodiment of a portion of a magnetic read transducer 100. For clarity, FIGS. 2A-2C are not to scale. The read transducer 100 may be part of a read head or may be part of a merged head that also includes a write transducer. The head of which the read transducer 100 is a part is contained in a disk drive having a media, a slider and the head coupled with the slider. Further, only a portion of the components of the read transducer 100 are depicted.

The transducer 100 includes optional soft magnetic shields 102 and 104, insulator 106, read sensor 110, side bias structures 130 and 150 and rear bias structure 160 that may be separated from the read sensor 110 by an insulating layer 155. The read sensor 110 includes a first free layer 112 and a second free layer 116 separated by a nonmagnetic spacer layer 114. The nonmagnetic spacer layer 114 may be conductive or an insulating tunneling barrier layer, such as MgO. The read sensor 110 is, therefore, a giant magnetoresistive or tunneling magnetoresistive read sensor in the embodiment shown. The free layers 112 and 116 are ferromagnetic and may include multiple layers. The free layers 112 and 116 are biased such that their magnetic moments 113 and 117, respectively are in a scissor mode. Based on the angle between the magnetic moments 113 and 117, the resistance of the read sensor 110 changes. This angle changes when the read 110 is under the influence of an external field, for example due to a bit being read. Thus, the resistance of the read sensor 110 may be used to read data. The read sensor 110 may also be configured for high density recording. Thus, in some embodiments, the track width (TW) of the read sensor 110 is not more than thirty nanometers. In some such embodiments, the track width is not more than twenty nanometers. In the embodiment shown, the shields 102 and 104 and the free layers 112 and 116 all have a stripe height, SH, in the stripe height direction. In other embodiments, however, different structures 102, 104, 112 and 116 may have different stripe heights.

The transducer 100 includes side magnetic bias structures 120 and a rear magnetic bias structure 160 that together magnetically bias the free layers 112 and 116 in a scissor mode. As can be seen in FIGS. 2A and 2B, the side bias structures 120 bias the magnetic moments 113 and 117, respectively, of the free layers 112 and 116, respectively, parallel to the ABS, in the cross-track direction. The magnetic bias structures 120 and free layers 112 and 116 are also configured to bias the magnetic moments 113 and 117 of the free layers 112 and 116, respectively, antiparallel. In some embodiments, the magnetic moments 113 and 117 of the free layers 112 and 116 are antiferromagnetically coupled. The rear magnetic bias structure 160 biases the magnetic moments 113 and 117 of the free layers 112 and 116, respectively, perpendicular to the ABS, in the stripe height direction.

Each bias structure 120 includes two magnetic bias structures 130 and 150 separated by a nonmagnetic structure 140. The first magnetic bias structure 130 magnetically biases the free layer 112 and, therefore, is adjacent to the sides of the free layer in the cross-track direction. Similarly, the second magnetic bias structure 150 magnetically biases the free layer 116 and is thus adjacent to the side of the free layer 116 in the cross-track direction. In the embodiment shown, the top surface of the first magnetic bias structure 130 is not higher than the upper surface of the first free layer 112. However, in other embodiments, the top surface of the magnetic bias structure 130 may be at another location. In some embodiments, the top surface of the first magnetic bias structure 130 is not higher than the lower surface of the second free layer 116. In other embodiments, the top surface of the first magnetic bias structure 130 is not higher than midway between the upper and lower surfaces of the second free layer 116. Although the top of the first magnetic bias structure 130 may be higher than bottom of the second free layer 116, the entire magnetic bias structure 130 is still lower than the second magnetic bias structure 150. Similarly, the bottom surface of the second magnetic bias structure 150 is not lower than the lower surface of the second free layer 116 in the embodiment depicted in FIGS. 2A-2C. However, in other embodiments, the bottom surface of the magnetic bias structure 150 may be at another location. For example, the bottom surface of the second magnetic bias structure 150 may not be lower than the upper surface of the first free layer 112. In other embodiments, the bottom surface of the magnetic structure 150 is not lower than midway between the upper and lower surfaces of the first free layer 112. Although the bottom of the second magnetic bias structure 150 may be lower than upper surface of the first free layer 112, the entire magnetic bias structure 150 is still higher than the first magnetic bias structure 130.

The magnetic bias structures 130 and 150 may take various forms. In some embodiments, both the first magnetic bias structure 130 and the second magnetic bias structure 150 are soft magnetic structures. For example, the magnetic bias structures 130 and 150 may be an alloy, multilayer or other structure that has a coercivity of not more than ten Oe. In some such embodiments, the soft magnetic bias structure(s) 130 and/or 150 have a coercivity of not more than five Oe. For example, the magnetic bias structures 130 and 150 may include CoFe and/or NiFe. In other embodiments, the magnetic bias structures 130 and/or 150 may have different magnetic properties. In some embodiments, the magnetic bias structure 130 and/or 150 may be a hard bias structure. For example, the first magnetic bias structure 130 may be an alloy or multilayer that has a sufficiently high coercivity to have its magnetic moment 132 substantially unchanged during operation of the transducer 100. In other embodiments, the first magnetic bias structure 130 may be a pinned structure. In such an embodiment, the first magnetic bias structure 130 may include a pinning layer, such as an antiferromagnetic (AFM) layer and a soft magnetic layer adjoining the pinning layer. In still other embodiments, the magnetic bias structure 130 and 150 may be configured in another manner. For example, the shield 102 is shown as being overmilled to allow for the soft bias structures 130 and 150. However, in other embodiments, the shield 102 may not be overmilled.

The first magnetic bias structure 130 may have a magnetic moment 132. The second magnetic bias structure 152 may have a magnetic moment 152. As can be seen in FIG. 2B, the magnetic moments 132 and 152 are antiferromagnetically aligned. Stated differently, the steady state orientation of the magnetic moments 132 and 152 is antiparallel. In some embodiments, the bias structures 130 and 150, and thus the magnetic moments 132 and 152, are antiferromagnetically coupled. Because of the orientations of the magnetic moments 132 and 152, the magnetic moment 113 of the first free layer 112 is biased in one direction, while the magnetic moment 117 of the second free layer 116 is biased in the opposite direction.

The magnetic transducer 100 also includes a rear magnetic bias structure 160. The rear bias structure may be a soft magnetic bias structure, a hard magnetic bias structure, or include both soft and hard magnetic bias structures. For example, a hard magnetic bias structure may be a magnetic structure having a coercivity of greater than one hundred Oersted. In some embodiments, the hard magnetic bias structure coercivity is at least one thousand Oersted. In contrast, a soft magnetic bias structure may have a coercivity of less than one hundred Oersted. In some embodiments, the soft magnetic bias structure coercivity is not more than ten Oersted. The hard and soft bias structure may include single alloys, multiple layer(s), a mixed-composition alloy and/or other components. Other components, such as a pinning structure, may be included in the rear bias structure 160. A pinning structure is a magnetic component used to magnetically bias other portions of the rear magnetic bias structure 160. For example, the pinning structure might be an antiferromagnetic (AFM) layer.

The read sensor 110 is between the rear bias structure 160 and the ABS. Further, an insulating layer 155 may separate the rear bias structure 160 from the sensor 110 and bias structures 120. Such an insulating layer 155 may be used if the rear bias structure 160 is conductive. In addition, although the shields 102 and 104 are shown as extending only to the stripe height of the sensor 110, the shields 102 and 104 generally extend significantly further in the stripe height direction. However, the shields 102 and 104 are also magnetically decoupled from the rear bias structure 160. Thus, the insulating layer 155 and a top insulating (not shown) may extend along the depth of the rear bias structure 160. For example, in some embodiments, the insulating layer 155 is at least ten Angstroms and not more than forty Angstroms thick. The insulating layer 155 is also nonmagnetic. Thus, the read sensor 110 may be electrically insulated from the rear bias structure 160 and not exchanged coupled with the rear soft bias structure 160. Although not depicted in FIGS. 2A-2C, an insulating capping layer may also be provided on top of the rear bias structure 160.

The rear bias structure 160 is shown having a width, w, in the cross-track direction; a length, l, in the stripe height direction and a thickness, t, in the down track direction. The width of the rear bias structure 160 is substantially equal to the track width, TW, of the read sensor 110. In some embodiments, this is because the sensor 110 and rear bias structure 160 are defined in the cross-track direction using a single mask. Stated differently, the rear bias structure 160 and sensor 110 may be self-aligned. In addition, the length, l, is greater than the width (l>w). Thus, the rear bias structure 160 has a shape anisotropy that is perpendicular to the ABS.

The magnetic moment 162 of the rear bias structure 160 is used to bias the sensor 110 in the stripe height direction. Consequently, the rear bias structure 160 has a magnetic anisotropy in the stripe height direction. This anisotropy may arise from one or more effects. For example, the rear bias structure 160 may have a shape anisotropy. In some embodiments, the length is at least four multiplied by the width. In some such embodiments, the length is at least ten multiplied by the width. The rear bias structure 160 may have a crystalline anisotropy that favors a perpendicular-to-ABS orientation of the magnetic moment 162. The rear bias structure 160 may have a magnetic anisotropy due to deposition in a magnetic field. In some embodiments, the rear bias structure 160 may have a magnetoelastic anisotropy, for example due to magnetostriction. In other embodiments, a pinning layer (not shown in FIGS. 2A-2C) or other structure (not shown) may be used to induce the magnetic anisotropy in the rear bias structure 160. In some embodiments, such a magnetic anisotropy is consistent with a reversal field of at least one thousand Oersted. In some such embodiments, the reversal field is at least five thousand Oersted.

Further, the rear bias structure 160 provides sufficient moment to bias the magnetic moments 113 and 117 of the free layers 112 and 116, respectively. For example, in some embodiments, the rear soft bias structure has a saturation magnetization-thickness product of at least one milli-emu/cm$^2$ and not more than three milli-emu/cm$^2$. In some such embodiments, the saturation magnetization-thickness product is not more than two milli-emu per cm$^2$. The thickness used in the saturation magnetization-thickness product is t, the depth of the rear bias structure 160 in the down track direction.

The magnetic transducer 100 may be suitable for use in high density magnetic recording applications, for example those having a sensor track width (and thus rear bias structure 160 width) of not more than thirty nanometers. In some embodiments, the track width and rear bias structure width may be not greater than twenty nanometers. The read sensor 110 may not include an antiferromagnetic layer or a pinned layer. Consequently, the shield-to-shield spacing (SS1) between the shields 102 and 104 may be reduced. The use of the scissor mode may also enhance the read signal. This scissor mode may be more reliably achieved because of the presence of the rear bias structure 160. In particular, the shape anisotropy, width and other aspects of the rear bias structure 160 may allow for more reliable biasing of the read sensor. The desired scissor mode may be achieved and performance may be improved.

Figure 3B:
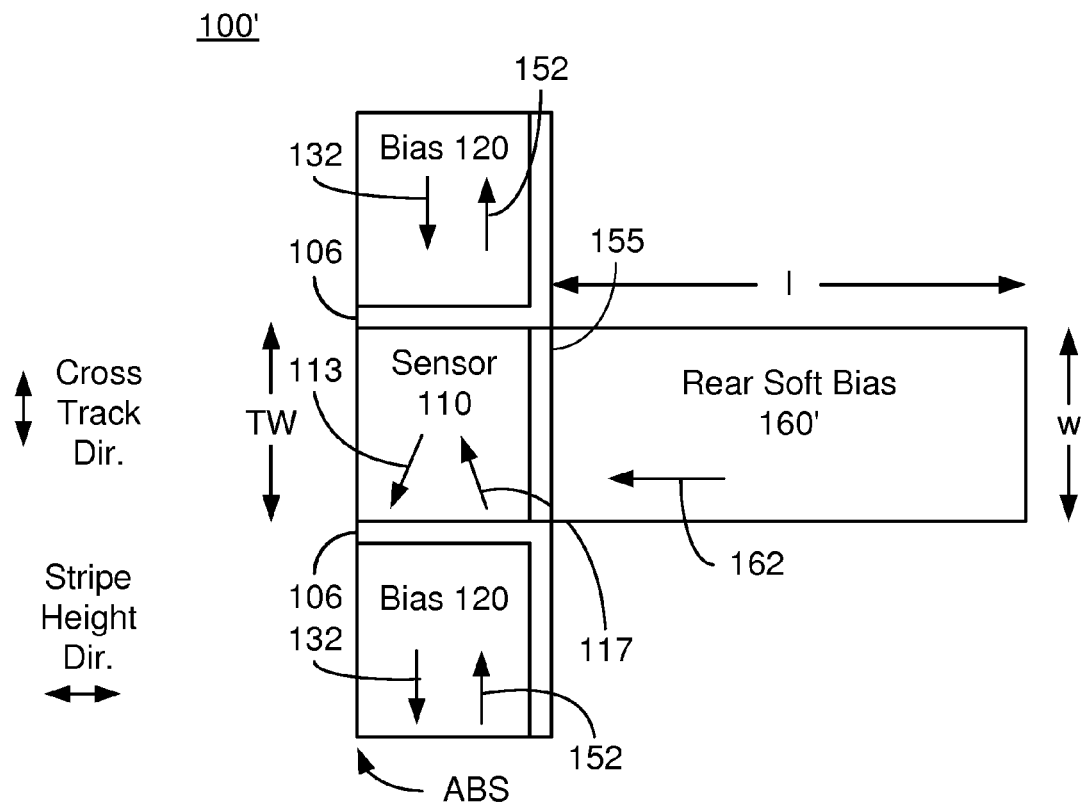
Figure 3B:
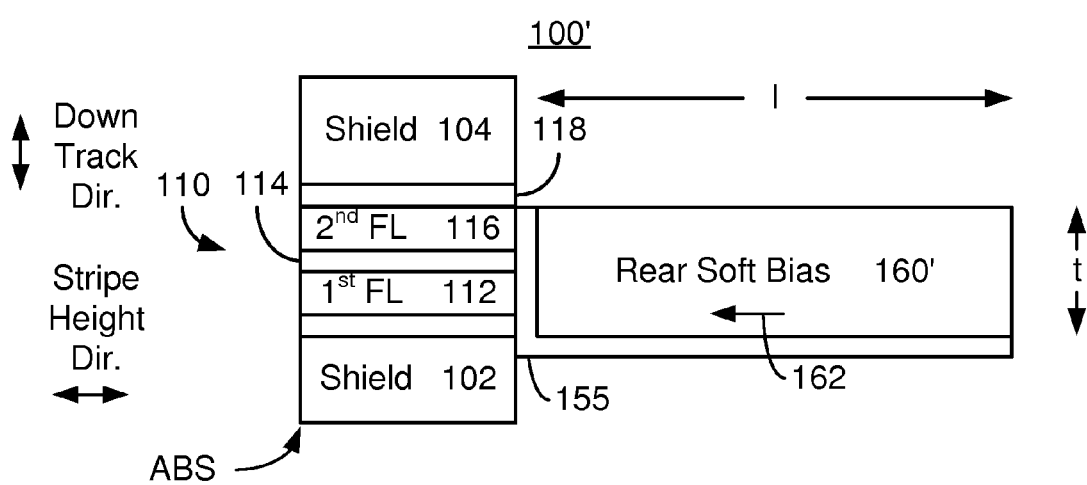

FIGS. 3A and 3B depict various views of another embodiment of a magnetic read transducer 100'. FIG. 3A depicts a plan view of an exemplary embodiment of the transducer 100'. FIG. 3B depicts a side view of the transducer 100'. For clarity, FIGS. 3A and 3B are not to scale. The read transducer 100' may be part of a read head or may be part of a merged head that also includes a write transducer. The head of which the read transducer 100' is a part is part of a disk drive having a media, a slider and the head coupled with the slider. The transducer 100' corresponds to the transducer 100. Consequently, analogous components are labeled similarly. For example, the transducer 100' includes a read sensor 110 having free layers 112 and 116 separated by a nonmagnetic spacer layer 114 that are analogous to such structures in the transducer 100. Thus, the components 102, 104, 110, 112, 114 116, 155 and 160' have a similar structure and function to the components 102, 104, 110, 112, 114 116, 155 and 160, respectively, depicted in FIGS. 2A-2C. Further, although an ABS view is not shown, the transducer 100' may appear substantially the same from the ABS as the transducer 100. The transducer 100' may also include structures analogous to the structures 120, 130, 140 and 150 depicted in FIGS. 2A-2C.

In the embodiment shown in FIGS. 3A-3B, the rear bias structure 160' consists of a rear soft bias structure 160'. Thus, the coercivity of the rear bias structure 160' is less than one hundred Oe. In some such embodiments, the coercivity of the rear soft bias structure 160' is less than ten Oe. The rear soft bias structure 160' may be configured such that the magnetization 162 is stable perpendicular to the ABS. For example, the rear soft bias structure 160' may have a magnetic anisotropy such that the magnetization 162 is stable during operation of the magnetic read transducer 100'. For example, a shape anisotropy may be used to stabilize the magnetization 162. In some embodiments, the length, l, of the rear soft bias structure 160' may be much greater than the width, w, or height, t. In the embodiment shown, the height, t, of the rear soft bias structure 160' is shown as the same as that of the read sensor 110. However, the heights may differ. However, the width of the rear soft bias structure 160' is substantially the same as the track width of the sensor 110 (TW=w to within processing limitations). In some embodiments the length is at least four times the width (l≥4w). In some such embodiments, the length is at least ten multiplied by the width (l≥10w).

The magnetic transducer 100' shares the benefits of the magnetic transducer 100. Performance and biasing of the sensor 110 may thus be improved.

Figure 4A:
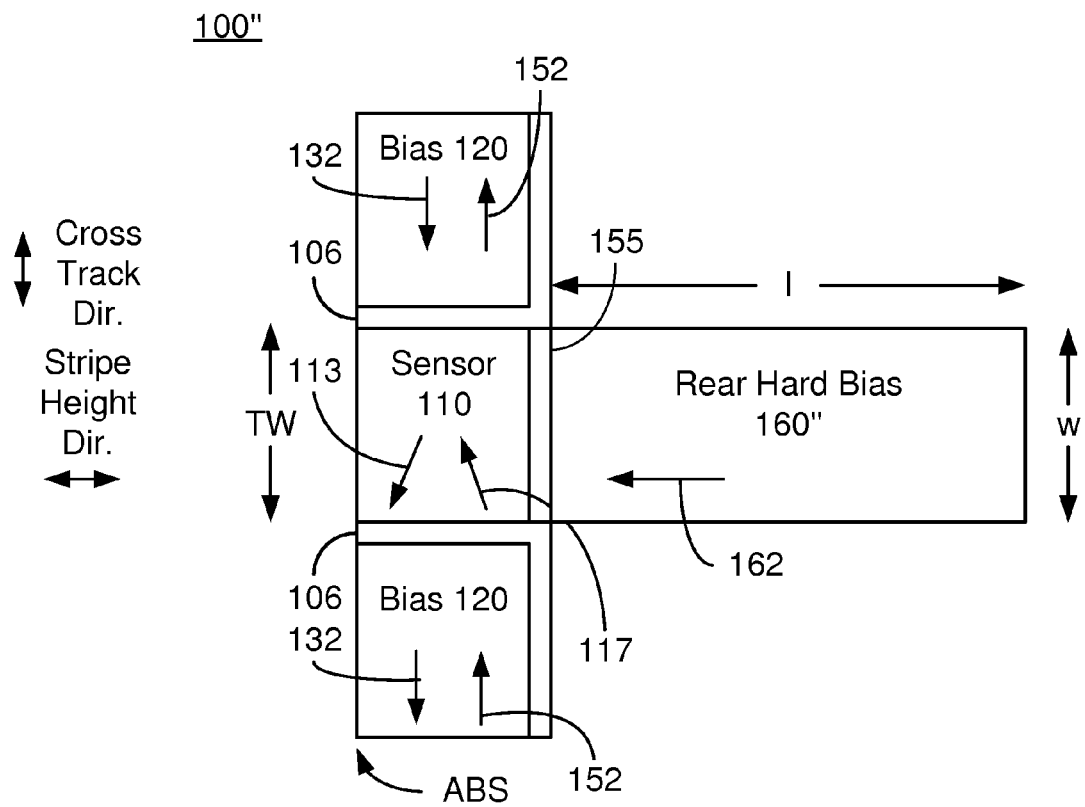
FIGS. 4A-4B depict plan and side views of another exemplary embodiment of a portion of a dual free layer magnetic read transducer.
Figure 4B:
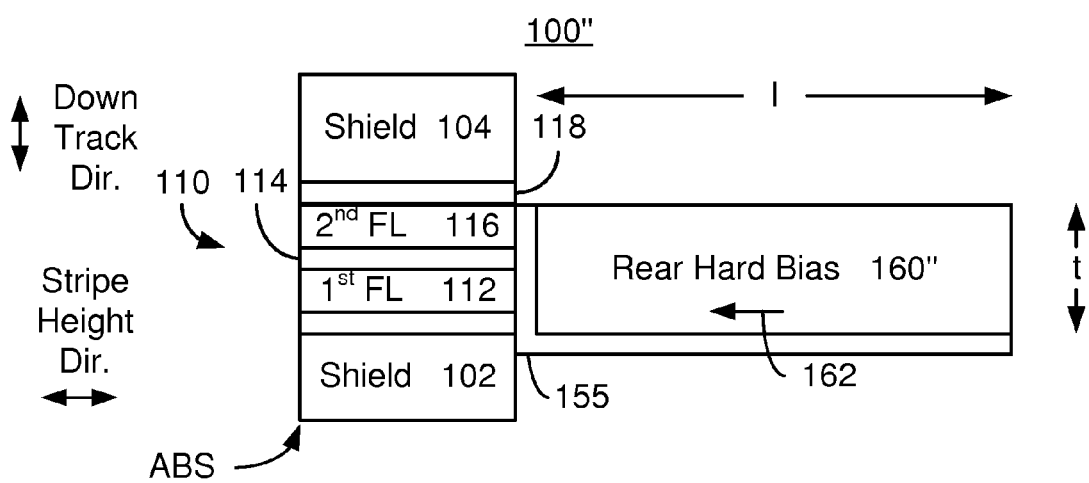

FIGS. 4A and 4B depict various views of another embodiment of a magnetic read transducer 100". FIG. 4A depicts a plan view of an exemplary embodiment of the transducer 100". FIG. 4B depicts a side view of the transducer 100". For clarity, FIGS. 4A and 4B are not to scale. The read transducer 100" may be part of a read head or may be part of a merged head that also includes a write transducer. The head of which the read transducer 100" is a part is part of a disk drive having a media, a slider and the head coupled with the slider. The transducer 100" corresponds to the transducer 100. Consequently, analogous components are labeled similarly. For example, the transducer 100" includes a read sensor 110 having free layers 112 and 116 separated by a nonmagnetic spacer layer 114 that are analogous to such structures in the transducer 100. Thus, the components 102, 104, 110, 112, 114 116, 155 and 160" have a similar structure and function to the components 102, 104, 110, 112, 114 116, 155 and 160, respectively, depicted in FIGS. 2A-2C. Further, although an ABS view is not shown, the transducer 100" may appear substantially the same from the ABS as the transducer 100/100'. The transducer 100" may also include structures analogous to the structures 120, 130, 140 and 150 depicted in FIGS. 2A-2C.

In the embodiment shown in FIGS. 4A-4B, the rear bias structure 160" consists of a rear hard bias structure 160". Thus, the coercivity of the rear bias structure 160' is greater than one hundred Oe. In some such embodiments, the coercivity of the rear hard bias structure 160" is greater than one thousand Oe. The rear hard bias structure 160" may be configured such that the magnetization 162" is stable perpendicular to the ABS. For example, the rear hard bias structure 160" may have an anisotropy such that the magnetization 162" is stable during operation of the magnetic read transducer 100". For example, a shape anisotropy may be used to stabilize the magnetization 162". In some embodiments, the length, l, of the rear hard bias structure 160" may be much greater than the width, w, or height, t. In the embodiment shown, the height, t, of the rear hard bias structure 160" is shown as the same as that of the read sensor 110. However, the heights may differ. However, the width of the rear hard bias structure 160" is substantially the same as the track width of the sensor 110 (TW=w to within processing limitations). In some embodiments the length is at least four times the width (l≥4w). In some such embodiments, the length is at least ten multiplied by the width (l≥10w).

The magnetic transducer 100" shares the benefits of the magnetic transducer 100. Performance and biasing of the sensor 110 may thus be improved.

Figure 5A:
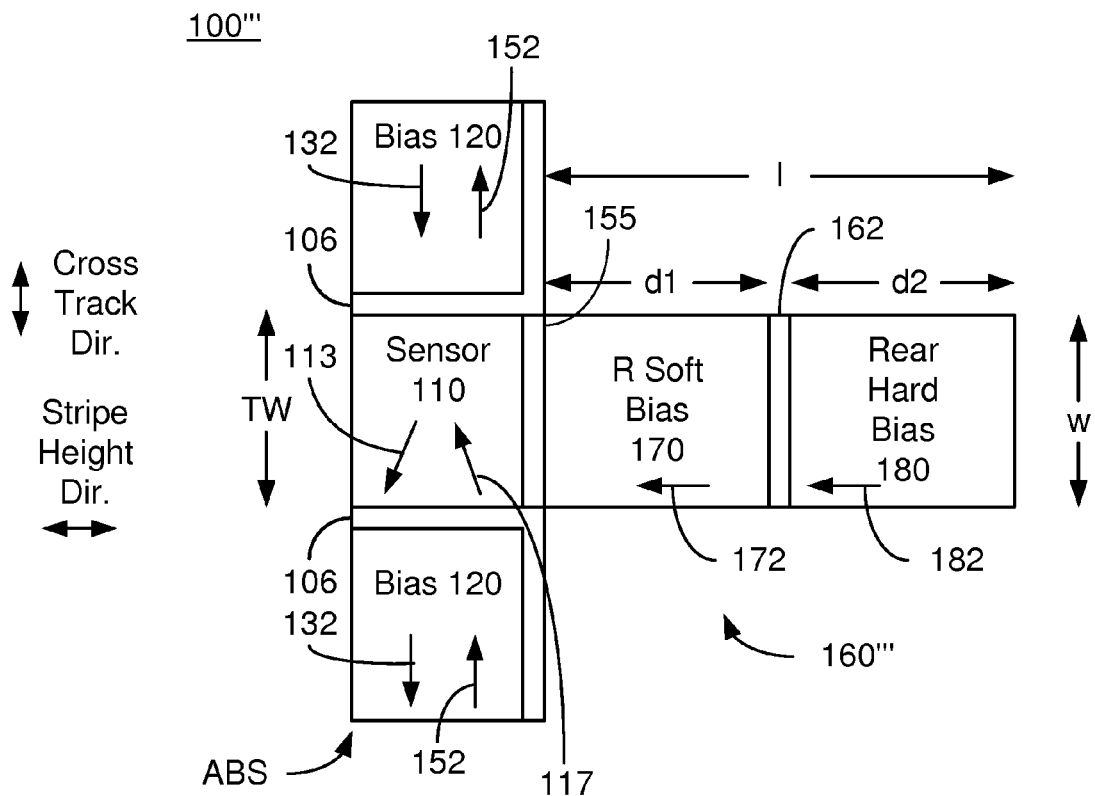
FIGS. 5A-5B depict plan and side views of another exemplary embodiment of a portion of a dual free layer magnetic read transducer.
Figure 5B:
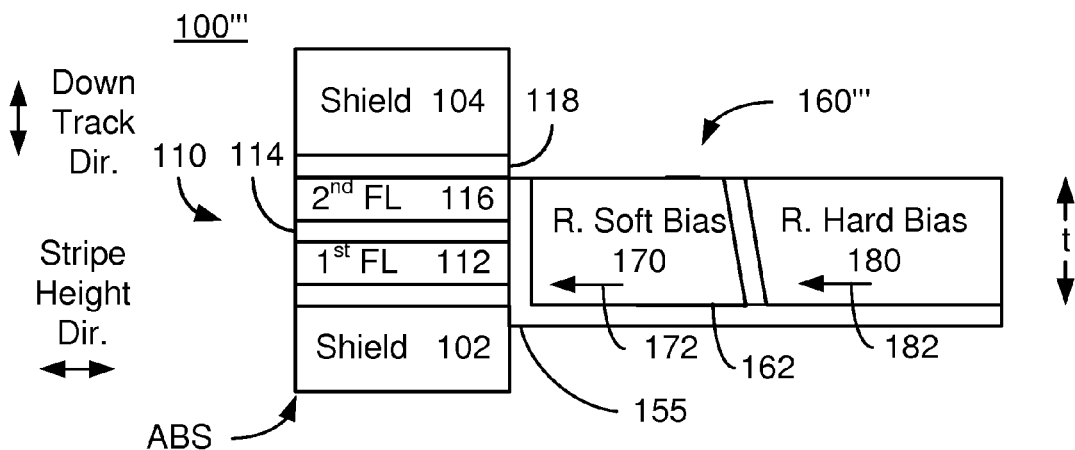

FIGS. 5A and 5B depict another embodiment of a magnetic read transducer 100'". FIG. 5A depicts a plan view of an exemplary embodiment of the transducer 100'". FIG. 5B depicts a side view of the transducer 100'". For clarity, FIGS. 5A and 5B are not to scale. The read transducer 100'" may be part of a read head or may be part of a merged head that also includes a write transducer. The head of which the read transducer 100'" is a part is part of a disk drive having a media, a slider and the head coupled with the slider. The transducer 100'" corresponds to the transducer(s) 100, 100' and/or 100". Consequently, analogous components are labeled similarly. For example, the transducer 100'" includes a read sensor 110 having free layers 112 and 116 separated by a nonmagnetic spacer layer 114 that are analogous to such structures in the transducer(s) 100, 100' and/or 100". Thus, the components 102, 104, 110, 112, 114 116, 155, 160'" have a similar structure and function to the components 102, 104, 110, 112, 114 116, 155, 160/160'/160", respectively, depicted in FIGS. 2A-3B. Further, although an ABS view is not shown, the transducer 100'" may appear substantially the same from the ABS as the transducer 100. The transducer 100'" may also include structures analogous to the structures 120, 130, 140 and 150 depicted in FIGS. 2A-2C.

The rear bias structure 160'" includes at least a rear soft bias structure 170 and a rear hard bias structure 180. The rear soft bias structure 170 is between the rear hard bias structure 180 and the sensor 110 as well as between the rear hard bias structure 180 and the ABS. The rear hard bias structure 180 may be a hard magnetic alloy, for example having a coercivity analogous to that discussed above for structure 160". For example, a CoPt alloy might be used. In other embodiments, the rear bias structure 180 may be a multilayer or other structure that functions as a hard bias structure.

The rear soft bias structure 170 is a soft bias structure. Thus, the coercivity of the rear soft bias structure 170 is analogous to that of the rear bias structure 160'. Further, the rear soft bias structure 170 provides sufficient moment to bias the magnetic moments 113 and 117 of the free layers 112 and 116, respectively. For example, in some embodiments, the rear soft bias structure has a saturation magnetization-thickness product of at least one milli-emu/cm$^2$ and not more than three milli-emu/cm$^2$. In some such embodiments, the saturation magnetization-thickness product is not more than two milli-emu per cm$^2$. The thickness used in the saturation magnetization-thickness product is t, the depth of the rear soft bias structure 170 in the down track direction.

The rear soft bias structure 170 has a magnetic moment 172 that biases the free layers 112 and 116 in a direction perpendicular to the bias direction from the magnetic bias structures 130 and 150. In the embodiment shown, this direction is perpendicular to the ABS. Similarly, the rear hard bias structure 180 has a magnetic moment 182 in a direction perpendicular to the ABS. Without the rear bias structure 160, the free layers 112 and 116 may be biased antiparallel. However, because the structures 130, 150 and 160 all magnetically bias the free layers 112 and 116, the free layers 112 and 116 are biased such that the magnetic moments 113 and 117 are in a scissor mode.

In some embodiments, the rear hard bias structure 180 is separated from the rear soft bias structure 170 by the nonmagnetic layer 162. The nonmagnetic layer 162 may be conductive. In some embodiments, the thickness of the nonmagnetic layer 162 in the stripe height direction is at least ten Angstroms and not more than forty Angstroms.

In the embodiment shown in FIGS. 5A-5B, the rear hard bias structure 180 and the rear soft bias structure 170 have similar geometries. In particular, the thicknesses are the same. However, in other embodiments, the thicknesses may differ. In the embodiment shown, the rear soft bias structure 170 has a length, d1 in the stripe height direction, while the hard bias structure 180 has length d2 in the stripe height direction. The total length, l, of the structure has an analogous relationship to the width, w, as described above. Further, the width of the structure 160'" is the same as the track width of the sensor (w=TW to within processing tolerances). The rear bias structures 170 and 180 have their magnetic moments 172 and 182, respectively, perpendicular to the ABS to bias the free layers 112 and 116 into a scissor state.

The magnetic transducer 100'" shares the benefits of the magnetic transducer(s) 100 and/or 100'. Further, omission of the nonmagnetic layer 162 between the soft bias structure 170 and the hard bias structure 180 may improve coupling between the structures 170 and 180. Performance and biasing of the sensor 110 may thus be improved.

Figure 6:
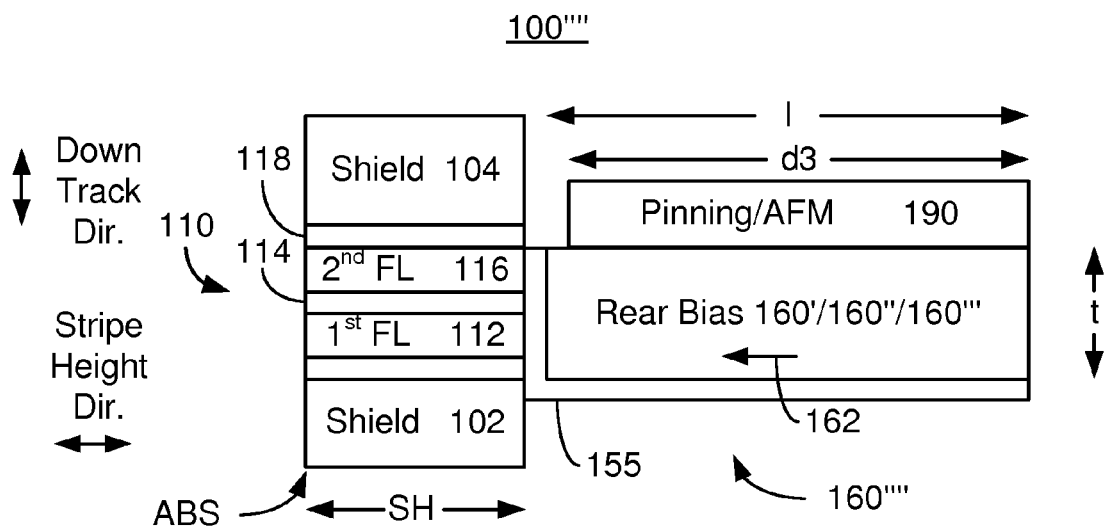
FIG. 6 depicts a side view of another exemplary embodiment of a portion of a dual free layer magnetic read transducer.

FIG. 6 depicts a side view of another embodiment of a magnetic read transducer 100"". For clarity, FIG. 6 is not to scale. The read transducer 100"" may be part of a read head or may be part of a merged head that also includes a write transducer. The head of which the read transducer 100"" is a part is part of a disk drive having a media, a slider and the head coupled with the slider. The transducer 100"" corresponds to the transducer(s) 100, 100', 100" and/or 100'". Consequently, analogous components are labeled similarly. For example, the transducer 100"" includes a read sensor 110 having free layers 112 and 116 separated by a nonmagnetic spacer layer 114 that are analogous to such structures in the transducer 100. Thus, the components 102, 104, 110, 112, 116, 155 and 160"" have a similar structure and function to the components 102, 104, 110, 112, 116, 155 and 160/160'/160"/160'", respectively, depicted in FIGS. 2A-5B. Further, although an ABS view is not shown, the transducer 100"" may appear substantially the same from the ABS as the transducer 100/100'. The transducer 100"" may also include structures analogous to the structures 120, 130, 140 and 150 depicted in FIGS. 2A-2C.

In the embodiment shown in FIG. 6, the rear bias structure 160"" includes a rear bias layer 160'/160"/160'" and pinning structure 190. The rear bias layer 160'/160"/160'" may be any one of a soft magnetic bias structure, a hard magnetic bias structure and a combination of soft and hard magnetic bias structures. The rear bias layer 160'/160"/160'" may be a single alloy layer, a multilayer, or another structure. The rear bias layer 160'/160"/160'" also has an anisotropy, as discussed above. For example, the length, l, of the rear bias layer 160'/160"/160'" may be much greater than the width or height, t. In the embodiment shown, the height, t, of the rear bias layer 160'/160"/160'" is shown as the same as that of the read sensor 110. However, the heights may differ. However, the width of the rear bias layer 160'/160"/160'" is the same as the track width of the sensor 110.

In addition, the rear bias structure 160"" includes the pinning layer 190. In some embodiments, the pinning layer 190 is an AFM, such as IrMn. For generality the depth, d3, of the pinning structure 190 is shown different from that of the rear bias layers 160'/160"/160'". However, in other embodiments, the depths may be the same. The pinning layer 190 is exchange coupled to the rear bias layer 160'/

160"/160'". As a result, the pinning layer 190 may aid in stabilizing the direction of the magnetic moment 162 of the rear bias layer 160'/160"/160'". For example, the pinning layer 190 may assist in returning the magnetic moment 162 to the desired direction shown in FIG. 6 in the event of a reversal.

The magnetic transducer 100"" shares the benefits of the magnetic transducer(s) 100, 100', 100" and/or 100'". Performance and biasing of the sensor 110 may thus be improved.

Figure 7:
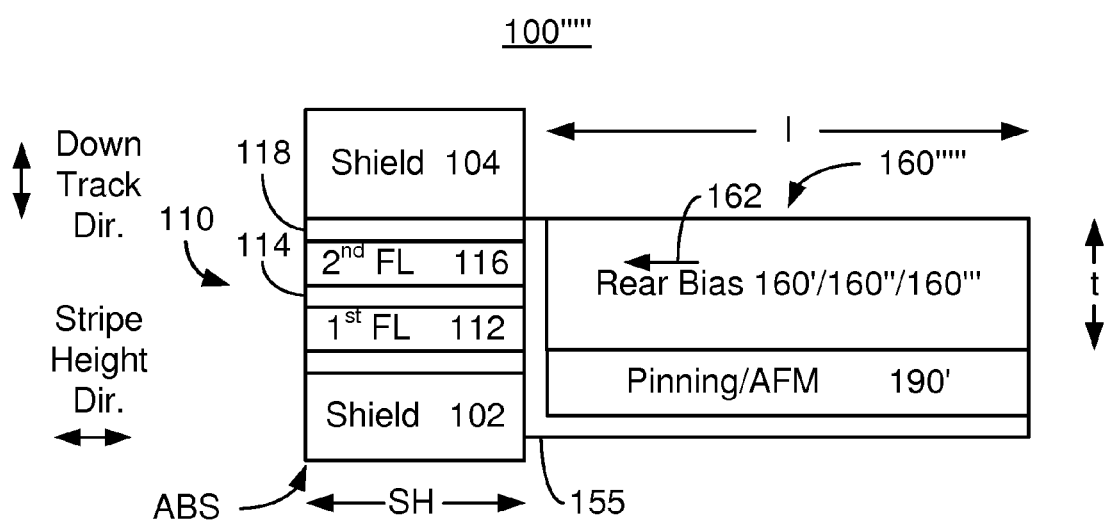
FIG. 7 depicts a side view of another exemplary embodiment of a portion of a dual free layer magnetic read transducer.

FIG. 7 depicts a side view of another embodiment of a magnetic read transducer 100'"". For clarity, FIG. 7 is not to scale. The read transducer 100'"" may be part of a read head or may be part of a merged head that also includes a write transducer. The head of which the read transducer 100'"" is a part is part of a disk drive having a media, a slider and the head coupled with the slider. The transducer 100'"" corresponds to the transducer(s) 100, 100', 100", 100'" and/or 100"". Consequently, analogous components are labeled similarly. For example, the transducer 100'"" includes a read sensor 110 having free layers 112 and 116 separated by a nonmagnetic spacer layer 114 that are analogous to such structures in the transducer 100. Thus, the components 102, 104, 110, 112, 116, 155 and 160'"" have a similar structure and function to the components 102, 104, 110, 112, 116, 155 and 160/160'/160"/160'"/160"", respectively, depicted in FIGS. 2A-6. Further, although an ABS view is not shown, the transducer 100'"" may appear substantially the same from the ABS as the transducer 100. The transducer 100'"" may also include structures analogous to the structures 120, 130, 140 and 150 depicted in FIGS. 2A-2C.

In the embodiment shown in FIG. 7, the rear bias structure 160'"" includes a rear bias layer 160'/160"/160'" and pinning structure 190'. The rear bias layer 160'/160"/160'" may be any one of a soft magnetic bias structure, a hard magnetic bias structure and a combination of soft and hard magnetic bias structures. The rear bias layer 160'/160"/160'" may be a single alloy layer, a multilayer, or another structure. The rear bias layer 160'/160"/160'" also has an anisotropy, as discussed above. For example, the length, l, of the rear bias layer 160'/160"/160'" may be much greater than the width or height, t. In the embodiment shown, the height, t, of the rear bias layer 160'/160"/160'" is shown as the same as that of the read sensor 110. However, the heights may differ. However, the width of the rear bias layer 160'/160"/160'" is the same as the track width of the sensor 110.

In addition, the rear bias structure 160'"" includes the pinning layer 190'. The pinning layer 190' is analogous to the pinning layer 190. However, the pinning layer 190' is below the rear bias layer 160'/160"/160'". Thus, the region behind the read sensor 110 may be overmilled. In some embodiments, the pinning layer 190' is an AFM, such as IrMn. The pinning layer 190' is exchange coupled to the rear bias layer 160'/160"/160'". Depth, l, of the pinning structure 190 is shown as the same as that of the rear bias layers 160'/160"/160'". However, in other embodiments, the depths may be different. As a result, the pinning layer 190' may aid in stabilizing the direction of the magnetic moment 162 of the rear bias layer 160'/160"/160'". For example, the pinning layer 190' may assist in returning the magnetic moment 162 to the desired direction shown in FIG. 7 in the event of a reversal.

The magnetic transducer 100'"" shares the benefits of the magnetic transducer(s) 100, 100', 100", 100'" and/or 100"". Performance and biasing of the sensor 110 may thus be improved.

The magnetic transducers 100, 100', 100", 100'", 100"" and 100'"" have been shown with various configurations to highlight particular features, such as differences in geometries. One of ordinary skill in the art will readily recognize that two or more of these features may be combined in various manners consistent with the method and system described herein that are not explicitly depicted in the drawings.

Figure 8:
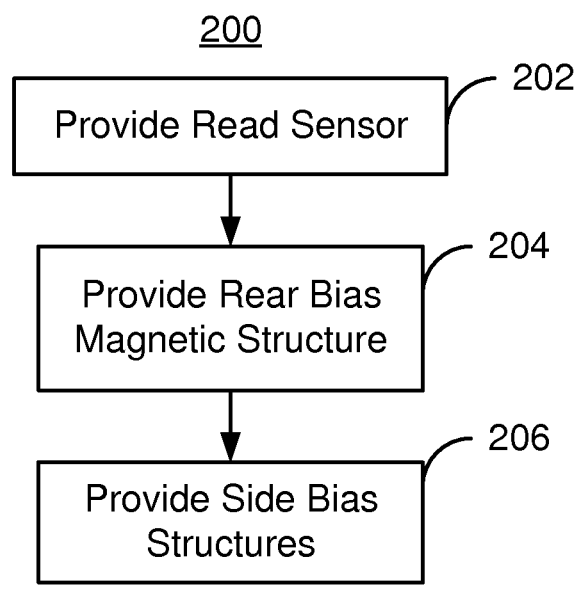
FIG. 8 is flow chart depicting an exemplary embodiment of a method for providing a magnetic recording read transducer.

FIG. 8 is an exemplary embodiment of a method 200 for providing a read transducer. For simplicity, some steps may be omitted, interleaved, combined, have multiple substeps and/or performed in another order unless otherwise specified. The method 200 is described in the context of providing a magnetic recording disk drive and transducer 100. However, the method 200 may be used in fabricating the transducer 100', 100", 100'", 100"" and/or 100'"". The method 200 may be used to fabricate multiple magnetic read heads at substantially the same time. The method 200 may also be used to fabricate other magnetic recording transducers. The method 200 is also described in the context of particular layers. A particular layer may include multiple materials and/or multiple sub-layers. The method 200 is described in the context of a disk drive. However, the method may be used in other applications employing a magnetoresistive and bias structures. The method 200 also may start after formation of other portions of the magnetic recording transducer.

The read sensor 110 is provided, via step 202. Step 202 may include depositing a stack of layers for the read sensor and defining the read sensor in the cross-track and stripe height directions. Further, the shield 102 and insulating layer 106 may also be provided. The rear bias structure 160 is provided, via step 204. Step 204 may be performed after the sensor 110 has been defined in at least the stripe height direction. Thus, at least part of step 204 is performed after at least part of step 202. Steps 202 and 204 also include defining the read sensor 110 and rear magnetic bias structure 160 in the track width direction such that the track width of the read sensor 110 and width of the rear magnetic bias structure 160 are the same. In some embodiments, the track width of the read sensor 110 and the width of the rear magnetic bias structure 160 are defined together.

The side bias structures 120 are provided, via step 206. Step 206 is performed after the read sensor is defined in the cross-track direction in step 202. Thus, at least part of step 202 is performed before step 204. Step 204 may include depositing the insulating layer 106, depositing the material(s) for the magnetic bias structures 130 and 170. A mill step and planarization, such as a chemical mechanical planarization (CMP) may also be performed.

Using the method 200, the transducers 100, 100', 100", 100'", 100"" and/or 100'"" may be fabricated. Thus, the benefits of one or more of the transducers 100, 100', 100", 100'", 100"" and/or 100'"" may be achieved. Consequently, biasing of the free layers 112 and 116 in the read sensor 110 may be improved.

Figure 9:
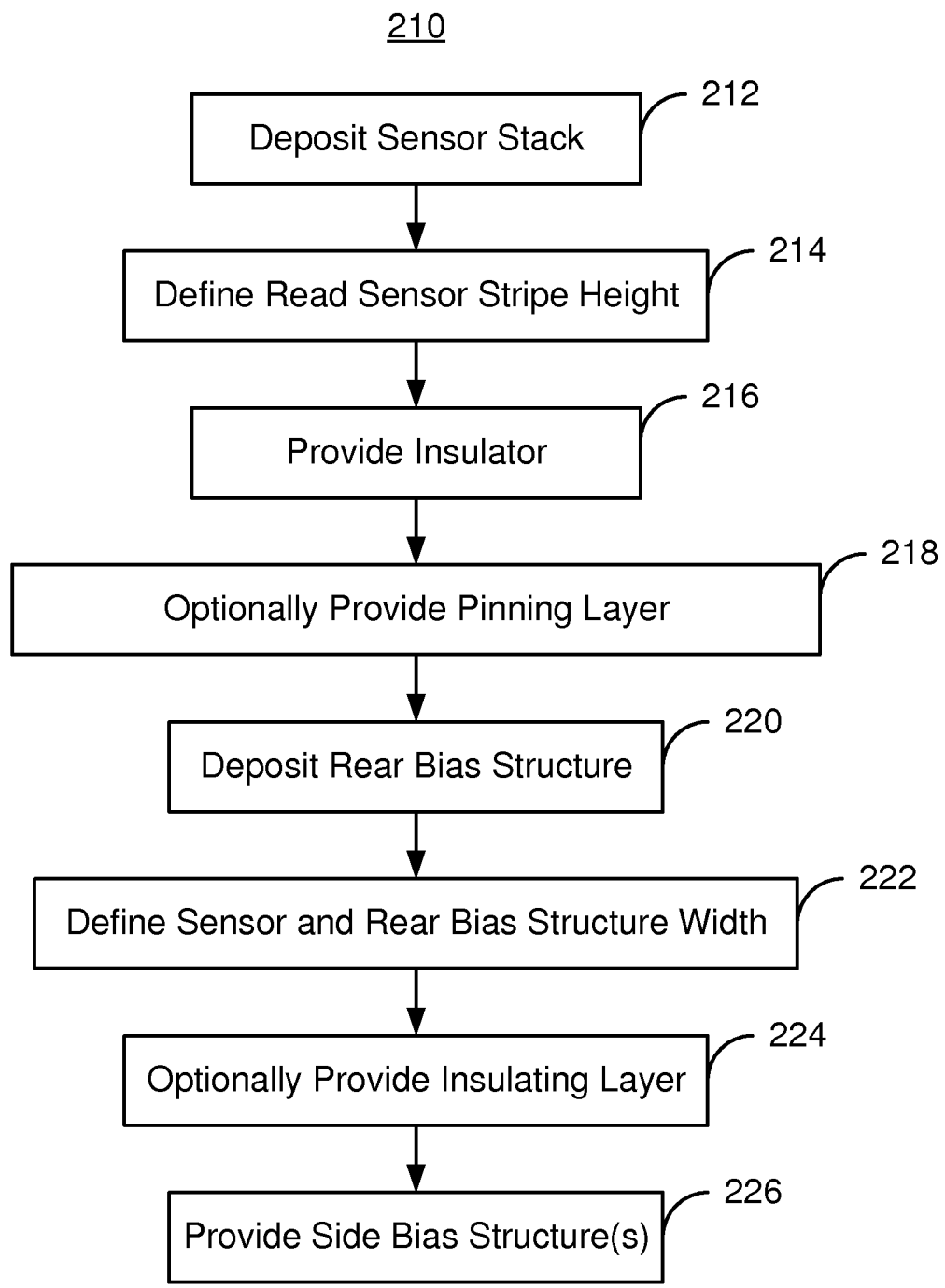
FIG. 9 is flow chart depicting another exemplary embodiment of a method for providing a magnetic recording read transducer.

FIG. 9 is an exemplary embodiment of a method 210 for providing a rear bias structure of a read transducer. For simplicity, some steps may be omitted, interleaved, combined, have multiple substeps and/or performed in another order unless otherwise specified. The method 210 is described in the context of providing a magnetic recording disk drive and transducer 100. However, the method 210 may be used in fabricating the transducer 100', 100", 100'", 100"" and/or 100'"". The method 210 may be used to fabricate multiple magnetic read heads at substantially the same time. The method 210 may also be used to fabricate other magnetic recording transducers. The method 210 is also described in the context of particular layers. A particular layer may include multiple materials and/or multiple sub-layers. The method 210 is described in the context of a disk drive. However, the method may be used in other applications employing a magnetoresistive and bias structures. The method 210 also may start after formation of other portions of the magnetic recording transducer.

The read sensor stack is deposited, via step 212. Step 212 includes depositing the free layer 112, depositing the nonmagnetic layer 114 and depositing the free layer 116. The read sensor 110 is defined in the stripe height direction, via step 214. In some embodiments, step 214 occurs before the read sensor is defined in the cross-track direction. Step 214 may include masking and ion milling the read sensor stack. Thus, space may be made for the rear bias structure 160/160'/160"/160'''/160''''. The insulating layer 155 is provided, via step 216. The pinning layer 190/190' may optionally be provided, via step 218.

The rear bias structure 160 is deposited, via step 220. Step 220 may include depositing one or more layer(s) for the rear bias structure 160. Step 220 may, for example, include depositing soft magnetic layer(s), hard magnetic layer(s) or both.

The rear soft bias structure 160 and the read sensor 110 may be defined in the cross track direction, via step 222. Thus, the rear soft bias structure 160 and the read sensor 110 are self-aligned and have matching track width/width.

An insulating layer 106 may be provided, via step 224. The side bias structures 120 may then be provided, via step 226.

Thus, the magnetic transducer 100 may be fabricated. The method 220 may also be used to fabricate the transducer(s) 100', 100", 100''', 100'''' and/or 100'''''. Thus, the benefits of one or more of the transducers 100, 100', 100", 100''', 100'''' and/or 100''''' may be achieved. Consequently, biasing of the free layers 112 and 116 in the read sensor 110 may be improved.

We claim:

1. A magnetic read apparatus having an air-bearing surface (ABS), the magnetic read apparatus comprising:
    a read sensor comprising a first free layer, a spacer layer, and a second free layer, the spacer layer being nonmagnetic and residing between the first free layer and the second free layer, the read sensor having a rear surface opposite to the ABS, at least one side surface and a track width in a cross-track direction;
    a rear magnetic bias structure configured to magnetically bias the read sensor in a stripe height direction perpendicular to the ABS, the read sensor being between the ABS and the rear magnetic bias structure, the rear magnetic bias structure having a width in the cross-track direction and a length in the stripe height direction, the length being greater than the width, the width of the rear magnetic bias structure being substantially equal to the track width of the read sensor, the rear magnetic bias structure including a rear hard magnetic bias structure having a hard bias coercivity of greater than one hundred Oersted;
    an insulating layer between the read sensor and the rear hard magnetic bias structure; and
    a side magnetic bias structure adjacent to each of the at least one side surface, the side magnetic bias structure comprising a first magnetic bias structure adjacent to a side surface of the first free layer in the cross-track direction and a second magnetic bias structure adjacent to a side surface of the second free layer in the cross-track direction, wherein the first magnetic bias structure and the second magnetic bias structure are separated by a non-magnetic structure.

2. The magnetic read apparatus of claim 1 wherein the rear magnetic bias structure has a reversal field of at least one thousand Oersted.

3. The magnetic read apparatus of claim 2 wherein the reversal field is at least five thousand Oersted.

4. The magnetic read apparatus of claim 1 wherein the track width of the read sensor is not more than thirty nanometers.

5. The magnetic read apparatus of claim 4 wherein the track width of the read sensor is not more than twenty nanometers.

6. The magnetic read apparatus of claim 1 wherein the hard bias coercivity is greater than one thousand Oersted.

7. The magnetic read apparatus of claim 1 wherein the rear magnetic bias structure includes:
    a pinning layer coupled to the rear hard bias structure.

8. The magnetic read apparatus of claim 1 wherein the side magnetic bias structure is configured to magnetically bias the first free layer and the second free layer to be antiferromagnetically aligned, and wherein the first magnetic bias structure and the second magnetic bias structure are antiferromagnetically aligned.

9. The magnetic read apparatus of claim 1 wherein the length of the rear magnetic bias structure is at least four times the width.

10. The magnetic read apparatus of claim 9 wherein the length of the rear magnetic bias structure is at least ten times the width.

11. The magnetic read apparatus of claim 1 further comprising an additional insulating layer between the side magnetic bias structure and the read sensor.

12. The magnetic read apparatus of claim 1, wherein the rear hard magnetic bias structure is conductive.

13. The magnetic read apparatus of claim 1, wherein the insulating layer includes:
    a first surface between the read sensor and the rear magnetic bias structure, and
    a second surface along the stripe height direction on a side of the rear magnetic bias structure, one end of the second surface coupled to the first surface.

14. A disk drive comprising:
    at least one slider comprising at least one magnetic transducer having an air-bearing surface (ABS), the at least one magnetic transducer comprising a read sensor and a rear magnetic bias structure, the read sensor comprising a first free layer, a spacer layer, and a second free layer, the spacer layer being nonmagnetic and residing between the first free layer and the second free layer, the read sensor having a rear surface opposite to the ABS, at least one side surface and a track width in a cross-track direction, the rear magnetic bias structure being configured to provide a magnetic bias to the read sensor in a stripe height direction perpendicular to the ABS, the read sensor being between the ABS and the rear magnetic bias structure, the rear magnetic bias structure having a width in the cross-track direction and a length in the stripe height direction, the length being greater than the width, the width of the rear magnetic bias structure being substantially equal to the track width of the read sensor, the rear magnetic bias structure including a rear hard magnetic bias structure having a hard bias coercivity of greater than one hundred Oersted, the at least one magnetic transducer further comprising an insulating layer between the read sensor and the rear hard magnetic bias structure, and a side magnetic bias structure adjacent to each of the at least one side surface, the side magnetic bias structure comprising a first magnetic bias structure adjacent to a side surface of the first free layer in the cross-track direction and a second magnetic bias structure adjacent to a side surface of the second free layer in the cross-track direction, wherein the first magnetic bias structure and the second magnetic bias structure are separated by a non-magnetic structure.

15. The disk drive of claim 14, wherein the rear hard magnetic bias structure is conductive.

16. A magnetic read apparatus having an air-bearing surface (ABS), the magnetic read apparatus comprising:
a read sensor comprising a first free layer, a spacer layer, and a second free layer stacked in a first direction, the spacer layer being nonmagnetic and disposed between the first free layer and the second free layer, the read sensor having a rear surface opposite to the ABS;
a rear magnetic bias structure coupled to the rear surface of the read sensor, the rear magnetic bias structure configured to magnetically bias the read sensor in a second direction perpendicular to the ABS, the read sensor disposed between the ABS and the rear magnetic bias structure, the rear magnetic bias structure having a hard bias coercivity of greater than one hundred Oersted, the rear magnetic bias structure having a width along a third direction and a length along the second direction, the length being greater than the width;
an insulating layer between the read sensor and the rear magnetic bias structure having the hard bias coercivity of greater than one hundred Oersted; and
a side magnetic bias structure on a side surface of the read sensor, the side surface of the read sensor facing in the third direction, the side magnetic bias structure comprising a first side magnetic bias structure to magnetically bias the first free layer and a second side magnetic bias structure to magnetically bias the second free layer.

17. The magnetic read apparatus of claim 16, wherein the rear magnetic bias structure is conductive.

18. The magnetic read apparatus of claim 16, wherein the insulating layer includes:
a first surface between the read sensor and the rear magnetic bias structure, and
a second surface along the second direction on a side of the rear magnetic bias structure, one end of the second surface coupled to the first surface.

\* \* \* \* \*